(12) United States Patent
Kweon et al.

(10) Patent No.: US 10,440,070 B2
(45) Date of Patent: Oct. 8, 2019

(54) METHOD AND APPARATUS FOR PROVIDING VIDEO SERVICE IN COMMUNICATION SYSTEM

(71) Applicant: Samsung Electronics Co., Ltd., Suwon-si, Gyeonggi-do (KR)

(72) Inventors: Ki-Suk Kweon, Suwon-si (KR); Han-Na Lim, Seongnam-si (KR); Ji-Cheol Lee, Suwon-si (KR); Hyun-Ah Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 15/204,445

(22) Filed: Jul. 7, 2016

(65) Prior Publication Data
US 2017/0013031 A1 Jan. 12, 2017

(30) Foreign Application Priority Data

Jul. 7, 2015 (KR) ........................ 10-2015-0096656

(51) Int. Cl.
*H04L 29/06* (2006.01)
*H04L 29/08* (2006.01)
*H04L 12/24* (2006.01)

(52) U.S. Cl.
CPC ...... *H04L 65/4015* (2013.01); *H04L 41/0896* (2013.01); *H04L 41/509* (2013.01);
(Continued)

(58) Field of Classification Search
CPC .............. H04L 41/5054; H04L 41/509; H04L 41/0896; H04L 65/4015; H04L 65/105;
(Continued)

(56) References Cited

U.S. PATENT DOCUMENTS 7,746,899 B2 6/2010 Kim
8,285,808 B1 * 10/2012 Joel .................. G06F 17/30905
709/213

(Continued)

FOREIGN PATENT DOCUMENTS

WO 2012/162275 A2 11/2012
WO 2014/067566 A1 5/2014

OTHER PUBLICATIONS

Extended European Search Report dated Sep. 7, 2018, issued in connection with a counterpart European application No. 16821670.3-1213/3320687.

*Primary Examiner* — Arvin Eskandarnia
*Assistant Examiner* — Chhian (Amy) Ling
(74) *Attorney, Agent, or Firm* — Jefferson IP Law, LLP

(57) ABSTRACT

A method of a terminal for providing a video service in a communication system is provided. The method includes requesting a server to transmit first video data in a maximum available bandwidth, receiving, from the server, the first video data in the maximum available bandwidth, determining a first bandwidth for the first video data and a second bandwidth for second video data within the maximum available bandwidth so that the first video data and the second video data have differential image qualities when an event of requesting the second video data is detected, requesting the server to transmit the first video data in the first bandwidth and to transmit the second video data in the second bandwidth, and receiving the first video data in the first bandwidth and receiving the second video data in the second bandwidth from the server.

14 Claims, 14 Drawing Sheets

(52) U.S. Cl.
CPC ........ *H04L 41/5054* (2013.01); *H04L 65/105* (2013.01); *H04L 65/1059* (2013.01); *H04L 65/1089* (2013.01); *H04L 65/4084* (2013.01); *H04L 65/80* (2013.01); *H04L 67/02* (2013.01); *H04L 67/28* (2013.01); *H04L 67/42* (2013.01); *H04L 69/16* (2013.01)

(58) Field of Classification Search
CPC ............. H04L 65/1059; H04L 65/1089; H04L 65/4084; H04L 65/80; H04L 67/02; H04L 67/28; H04L 67/42; G06F 3/012; G06T 19/006
See application file for complete search history.

(56) References Cited

U.S. PATENT DOCUMENTS

| | | | |
|---|---|---|---|
| 8,438,605 | B2 | 5/2013 | Sugiyama et al. |
| 2008/0117836 | A1* | 5/2008 | Savoor ................ H04L 41/0896 370/254 |
| 2010/0274909 | A1 | 10/2010 | Mochida |
| 2011/0161485 | A1 | 6/2011 | George et al. |
| 2011/0261835 | A1 | 10/2011 | Dhesikan et al. |
| 2012/0131627 | A1 | 5/2012 | Chittella |
| 2012/0314763 | A1 | 12/2012 | Kuhtz |
| 2013/0227102 | A1 | 8/2013 | Beck et al. |
| 2014/0022329 | A1* | 1/2014 | Kim ...................... H04N 7/147 348/14.03 |
| 2015/0029861 | A1* | 1/2015 | Yazaki .................... H04L 69/16 370/235.1 |
| 2015/0070274 | A1* | 3/2015 | Morozov ............. G06F 3/0346 345/156 |
| 2017/0273126 | A1* | 9/2017 | Lim ...................... H04W 36/02 |
| 2018/0089903 | A1* | 3/2018 | Pang ...................... H04N 19/33 |

* cited by examiner

```
┌─────────────────────────────────────────────────┐
│              VIDEO QUALITY PRIORITY             │
│                                                 │
│  [✓] VIDEO DISPLAYED IN FULL SCREEN             │
│                                                 │
│  [ ] VIDEO DISPLAYED IN PORTION OF SCREEN       │
│                                                 │
│  [ ] VARIABLE DEPENDING ON NETWORK CONDITION    │
│                                                 │
└─────────────────────────────────────────────────┘
```

| UE ID | Domain | TCP session id | TCP session info. |
|---|---|---|---|
| UE 1 | Domain1 | TCP session 1 | BW/encoding rate 1 |
| | Domain1 | TCP session 2 | - |

FIG. 18

| UE ID | Domain | TCP session id | TCP session info. |
|---|---|---|---|
| UE 1 | Domain1 | TCP session 1 | BW/encoding rate 3 |
| | Domain1 | TCP session 2 | BW/encoding rate 2 |

FIG. 19

METHOD AND APPARATUS FOR PROVIDING VIDEO SERVICE IN COMMUNICATION SYSTEM

CROSS-REFERENCE TO RELATED APPLICATION(S)

This application claims the benefit under 35 U.S.C. § 119(a) of a Korean patent application filed on Jul. 7, 2015 in the Korean Intellectual Property Office and assigned Serial number 10-2015-0096656, the entire disclosure of which is hereby incorporated by reference.

TECHNICAL FIELD

The present disclosure relates to a method and an apparatus for providing a video service in a communication system. More particularly, the present disclosure relates to a method and an apparatus for providing a video service to support various levels of image qualities.

BACKGROUND

In order to meet increasing demands for wireless data traffic after the commercialization of fourth-generation (4G) communication systems, efforts have been made to develop advanced fifth-generation (5G) communication systems or pre-5G communication systems. This is one reason why 5G communication systems or pre-5G communication systems are called beyond 4G network communication systems or post long term evolution (LTE) systems.

To achieve a high data transmission rate, 5G communication systems are being developed to be implemented in an ultrahigh frequency band (mmWave, for example, a 60-GHz band). In order to reduce the occurrence of stray radio waves in an ultrahigh frequency band and to increase the transmission distance of radio waves in 5G communication systems, technologies are under discussion, for example, beam-forming, massive multiple-input and multiple-output (massive MIMO), full dimension MIMO (FD-MIMO), array antennas, and analog beam-forming, large-scale antennas.

Further, in order to improve a system network, for 5G communication systems, technologies have been developed, for example, evolved small cell, advanced small cell, cloud radio access network (cloud RAN), ultra-dense network, device-to-device communication (D2D), wireless backhaul, moving network, cooperative communication, coordinated multi-points (CoMP), interference cancellation, etc.

In addition, for 5G communication systems, other technologies have been developed, for example, advanced coding modulation (ACM), such as hybrid frequency shift keying (FSK) and quadrature amplitude modulation (QAM) (FQAM) and sliding window superposition coding (SWSC), and advanced access schemes, such as filter bank multi carrier (FBMC), non-orthogonal multiple access (NOMA), and sparse code multiple access (SCMA).

Terminals for communication systems include electronic terminals in a wearable form. Such electronic terminals are generally called wearable devices, and various forms of wearable devices are being developed. For example, the wearable devices may be provided in various forms that are attachable to the human body or clothes, such as head-mounted (glasses) type, wrist-wearable (watch or wristband) type, contact lens type, ring type, shoes type, clothes type, and the like. The wearable devices enable an electronic terminal to be worn on the body, like clothes or glasses, thereby increasing portability and accessibility.

Among various forms of wearable electronic terminals, for example, head-mounted wearable devices, such as a head-mounted display (HMD), are largely being developed. An HMD may provide a video service in a see-through form that provides augmented reality (AR) and in a see-closed form that provides virtual reality (VR).

The see-through form composes or combines a virtual subject or object with the real world using characteristics of a transflective lens to provide reinforced additional pieces of information that are difficult to obtain only with the real world. The see-closed form is a form of two displays placed before the user's eyes, which allows the user to enjoy content (game, movie, streaming, broadcast, and the like), provided via an external input, on a separate screen alone, thereby providing an excellent sense of immersion.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for providing a video service so as to support various levels of image qualities in a communication system.

Another aspect of the present disclosure is to provide a method and an apparatus for providing a video service that are capable of outputting a plurality of video data on a single screen in a communication system.

Another aspect of the present disclosure is to provide a method and an apparatus for providing a video service that are capable of outputting a plurality of video data based on option information through a single screen in a communication system.

In accordance with an aspect of the present disclosure, a method of a terminal for providing a video service in a communication system is provided. The method includes requesting a server to transmit first video data in a maximum available bandwidth, receiving, from the server, the first video data in the maximum available bandwidth, determining a first bandwidth for the first video data and a second bandwidth for second video data within the maximum available bandwidth so that the first video data and the second video data have differential image qualities when an event of requesting the second video data is detected, requesting the server to transmit the first video data in the first bandwidth and to transmit the second video data in the second bandwidth, and receiving the first video data in the first bandwidth and receiving the second video data in the second bandwidth from the server.

In accordance with another aspect of the present disclosure, a method of a proxy server for providing a video service in a communication system is provided. The method includes establishing, with a terminal, a first transmission control protocol (TCP) session for transmitting and receiving first video data, receiving, from the terminal, a request message that requests establishment of a second TCP session when a domain address providing the first video data is included in a domain address list including domain addresses providing the video service, and verifying the request message and transmitting, to the terminal, a response message that indicates that the second TCP session is established.

In accordance with another aspect of the present disclosure, a method of a video server for providing a video service in a communication system is provided. The method includes receiving, from a terminal, a request message requesting reception of first video data in a maximum available bandwidth, transmitting, to the terminal, the first video data in the maximum available bandwidth, receiving, from the terminal, a request message requesting reception of the first video data in a first bandwidth within the maximum available bandwidth and a request message requesting reception of second video data in a second bandwidth, and transmitting the first video data in the first bandwidth and the second video data in the second bandwidth, wherein the first bandwidth and the second bandwidth are determined to provide differential image qualities.

In accordance with another aspect of the present disclosure, an apparatus of a terminal for providing a video service in a communication system is provided. The apparatus includes a processor configured to: request a server to transmit first video data in a maximum available bandwidth, determine a first bandwidth for the first video data and a second bandwidth for second video data within the maximum available bandwidth so that the first video data and the second video data have differential image qualities when an event of requesting the second video data is detected, and request the server to transmit the first video data in the first bandwidth and to transmit the second video data in the second bandwidth, and a transceiver configured to receive, from the server, the first video data in the maximum available bandwidth, receive the first video data in the first bandwidth, and receive the second video data in the second bandwidth from the server.

In accordance with another aspect of the present disclosure, an apparatus of a proxy server for providing a video service in a communication system is provided. The apparatus includes a processor configured to establish, with a terminal, a TCP session for transmitting and receiving first video data, a receiver configured to receive, from the terminal, a request message that requests establishment of a second TCP session when a domain address providing the first video data is included in a domain address list including domain addresses providing the video service, and a transmitter configured to transmit, to the terminal, a response message that indicates that the second TCP session is established.

In accordance with another aspect of the present disclosure, an apparatus of a video server for providing a video service in a communication system is provided. The apparatus includes a receiver configured to receive, from a terminal, a request message requesting reception of first video data in a maximum available bandwidth, a request message requesting reception of the first video data in a first bandwidth within the maximum available bandwidth, and a request message requesting reception of second video data in a second bandwidth, and a transmitter configured to transmit, to the terminal, the first video data in the maximum available bandwidth, transmit the first video data in the first bandwidth, and transmit the second video data in the second bandwidth, wherein the first bandwidth and the second bandwidth are determined to provide differential image qualities.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 18 and 19 illustrate examples of binding domain lists managed by a proxy server according to various embodiments of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An embodiment of the present disclosure relates to a method and an apparatus for providing a video service that are capable of outputting a plurality of video data based on option information through a single screen in a communication system. A video service that enables a terminal of a communication system to output a plurality of video data through a single screen may be, for example, a virtual reality (VR) tour service or VR notification service.

The VR tour service is a service that allows the terminal to output tourist information on a selected tourist spot in a form of 360-degree video data when the specific tourist spot is selected.

Figure 1:
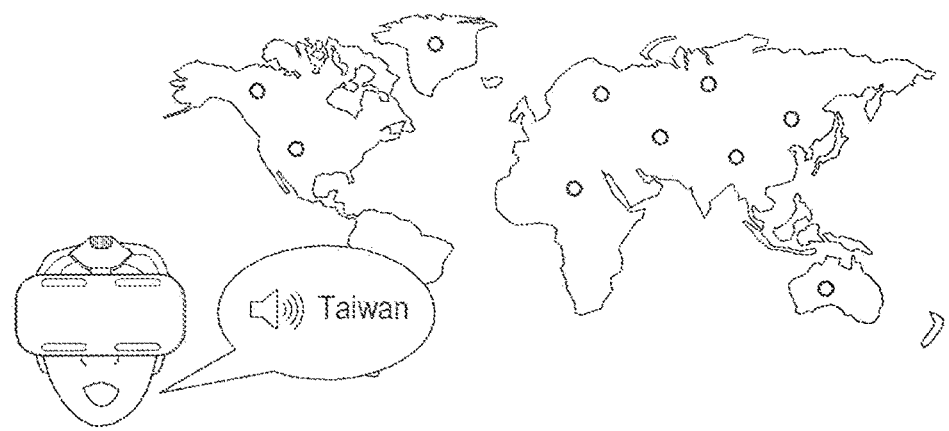
FIGS. 1, 2, and 3 illustrate examples of a virtual reality (VR) tour service according to various embodiments of the present disclosure.
Figure 2:
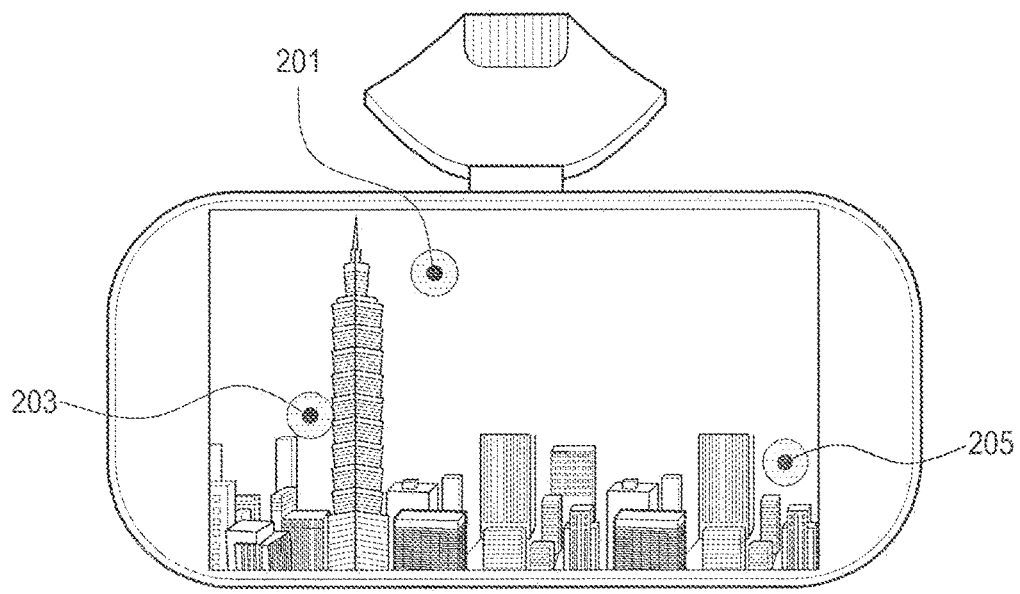
Figure 3:
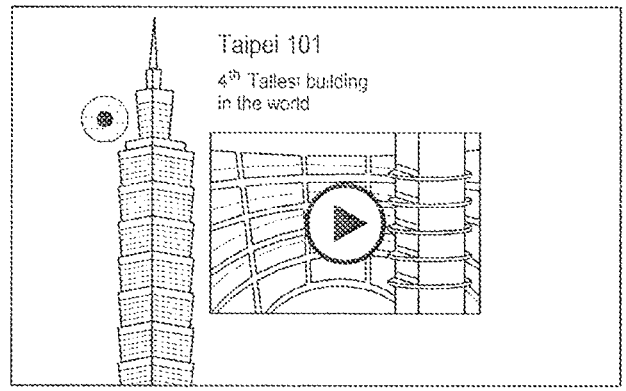

FIGS. 1 to 3 illustrate examples of the VR tour service according to an embodiment of the present disclosure.

Specifically, FIG. 1 illustrates video data output on the terminal when a user wearing the terminal that provides the VR tour service runs the VR tour service.

Referring to FIG. 1, circle icons on the video data output on the terminal show the locations of countries that the VR tour service may provide. The terminal may receive user option information on a specific region (for example, Taiwan) selected from the output video data. Here, the user may select the specific region using not only a voice but also a motion, head tracking, and an input tool including a VR wheel.

FIG. 2 illustrates an example of outputting 360-degree video data on the specific region selected by the user.

Referring to FIG. 2, when the user selects, for example, Taiwan, the terminal outputs 360-degree video data on Taiwan on a screen. Here, additional information providing portions 201, 203, and 205 may be displayed on the video data output on the terminal with at least one predetermined marker. For example, the terminal may display the additional information providing portions 201, 203, and 205 on the video data in a red icon or text. When reference number 201 is selected by the user while the terminal is outputting the 360-degree video data on Taiwan, the terminal may output the 360-degree video data on Taiwan (hereinafter, "main video data") simultaneously with video data on reference number 201 (hereinafter, "sub-video data") on a single screen, as illustrated in FIG. 3. Then, as illustrated in FIG. 3, the user may view the sub-video data simultaneously with the main video data on the same screen.

For another example, the VR notification service is a service that allows the terminal to output video data on a specific event while outputting user-desired video data when the specific event of being requested to provide sub-video data is detected.

Figure 4:
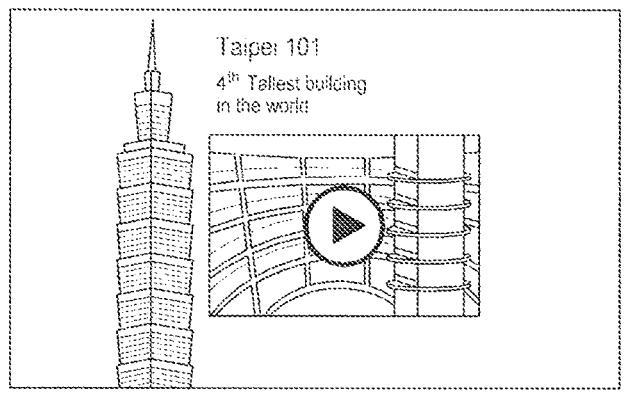
FIG. 4 illustrates an example of a VR notification service according to an embodiment of the present disclosure.

FIG. 4 illustrates an example of the VR notification service according to an embodiment of the present disclosure.

Referring to FIG. 4, in a case where the user sets as a notification event in advance a situation where the user's son comes to a schoolyard, when the terminal recognizes that the son comes to the schoolyard after school while providing user-desired video data (for example, 360-degree movie video data, main video data), the terminal outputs video data on the schoolyard (that is, sub-video data) on the screen that is displaying the main video data. Here, it is possible for the terminal to receive the video data on the schoolyard in real time via a security camera or the like provided by the school.

As illustrated in FIGS. 3 and 4, video data output from the terminal may be divided into main video data and sub-video data. The main video data is data output by the terminal on the entire screen, for example, three-dimensional (3D) or 360-degree streaming data. The sub-video data is data output on a portion of the screen that is displaying the main video data, for example, two-dimensional (2D) or 3D streaming data.

The 2D, 3D, or 360-degree video data are provided to the terminal through a transmission control protocol (TCP) flow between the terminal and a video server that provides video data. The TCP flow generally enables connection between the terminal and the video server to be maintained for a long time for data transmission and reception and enables transmission and reception of high-capacity data. That is, the TCP flow exhibits characteristics of a long and fat flow. Therefore, in various embodiments of the present disclosure, there is required a method for the terminal to efficiently provide main video data or sub-video data according to a user option using data transmission and reception characteristics of the TCP flow.

Currently, most video data are provided from a terminal by a hypertext transfer protocol (HTTP) adaptive video streaming method. The HTTP adaptive video streaming method is a method in which a terminal determines the encoding rate of video data that varies according to an available bandwidth to request video data from a video server. A terminal according to an embodiment of the present disclosure also uses the HTTP adaptive video streaming method to provide video data. Here, the terminal may use the maximum available bandwidth to provide main video data. However, the maximum available bandwidth that is available for the terminal is limited. That is, when the terminal detects an event of being requested to provide sub-video data while outputting main video data, since the maximum available bandwidth is already used for the main video data, the terminal has a delay and buffering of the sub-video data when outputting the sub-video data. Further, when the video server is requested to provide the sub-video data from the terminal, such a sudden request for high-capacity data may cause congestion. Accordingly, transmission rate at which the video server transmits the main video data is affected to cause deterioration in the image quality of the main video data.

Thus, in various embodiments of the present disclosure, there is required a method for providing a video service that is capable of efficiently outputting main video data or sub-video data within the maximum available bandwidth that is available for the terminal.

Figure 5:
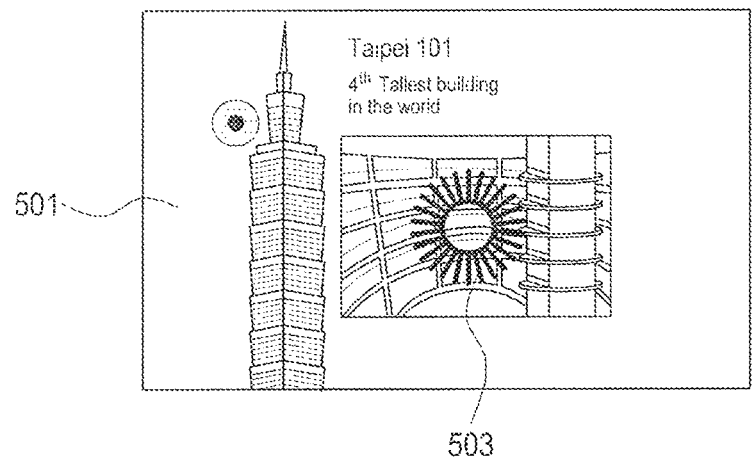
FIG. 5 illustrates a video service provided when an embodiment of the present disclosure is not applied.

As described above, when the terminal outputs sub-video data on the screen that is displaying main video data using a general technique, a video service illustrated in FIG. 5, instead of a video service in FIG. 3, may be provided.

FIG. 5 illustrates a video service provided when an embodiment of the present disclosure is not applied.

Referring to FIG. 5, when a terminal outputs a plurality of video data on a single screen using a general technique, deterioration 501 in the image quality of main video data and buffering 503 of sub-video data may occur.

To solve the deterioration in the image quality of the main video data and buffering of the sub-video data that occur in the terminal, an embodiment of the present disclosure suggests a method of efficiently providing the image qualities of main video data and sub-video data within a bandwidth available for the terminal. Further, an embodiment of the present disclosure suggests a method for the terminal to provide a video that satisfies the quality of experience (QoE) of a user without changing an operation of a video server and a device.

To this end, a method and an apparatus for providing a video service that enable a terminal to output main video data and sub-video data according to various embodiments of the present disclosure will be described below in detail with reference to drawings. The following embodiments of the present disclosure may be applicable not only to the VR tour service or VR notification service but also to any service of a terminal outputting a plurality of video data (that is, at least two or more video data) on a single screen.

A method for a terminal to output main video data according to an embodiment of the present disclosure is described first with reference to FIGS. 6 and 7, and then a method for the terminal to output sub-video data is described with reference to FIGS. 8 to 12.

Figure 6:
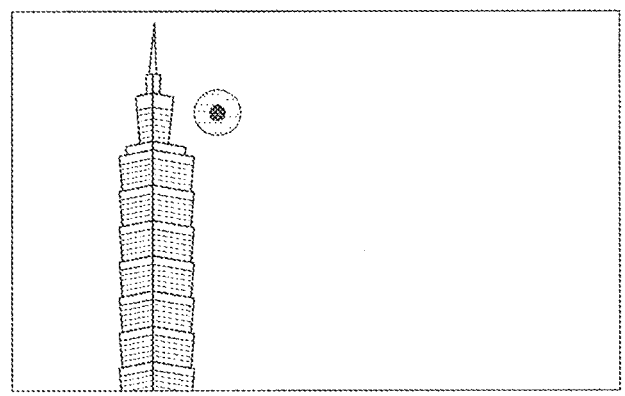
FIG. 6 illustrates an example that a terminal outputs main video data on a screen according to an embodiment of the present disclosure.

FIG. 6 illustrates an example in which a terminal outputs main video data on a screen according to an embodiment of the present disclosure.

Referring to FIG. 6, when the terminal detects that a VR service is run, the terminal may output high-quality main video data on the screen. A method for the terminal to output the high-quality main video data on the screen may be implemented through a signaling flow illustrated in FIG. 7.

Figure 7:
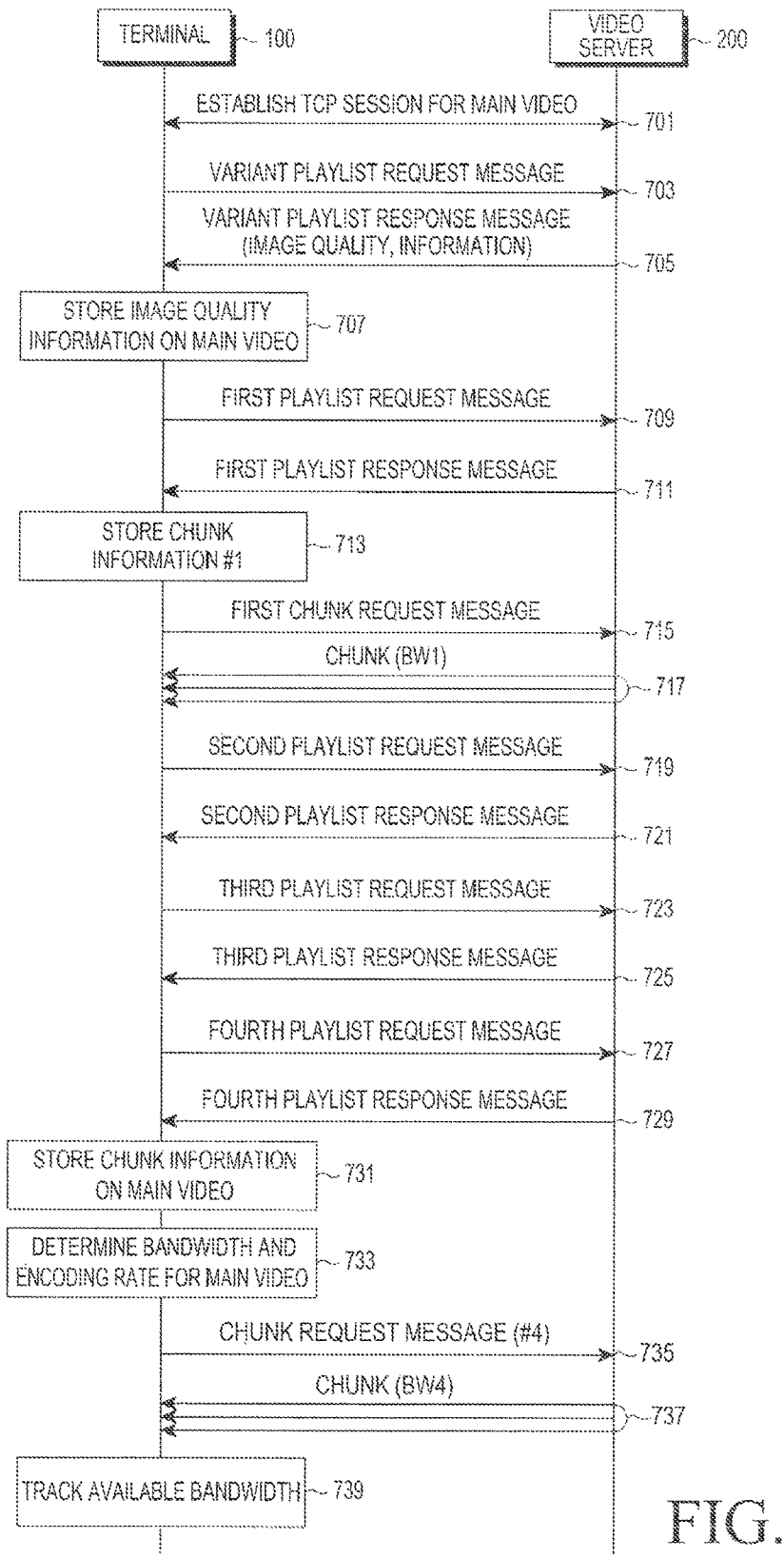
FIG. 7 illustrates a method of a terminal to output main video data on a screen according to an embodiment of the present disclosure.

FIG. 7 illustrates a method for a terminal to output main video data on a screen according to an embodiment of the present disclosure.

Referring to FIG. 7, the terminal 100 and a video server 200 establish a TCP session for main video data at operation 701. When the terminal 100 receives an event of being requested to provide main video data, the terminal 100 transmits a variant playlist request message about the main video data to the video server 200 at operation 703. The variant playlist request message may include information indicating that the main video data is requested by the user.

The terminal 100 receives, from the video server 200, a variant playlist response message including image quality information on the main video data in response to the variant playlist request message at operation 705. The variant playlist response message may include, as the image quality information on the main video data, a plurality of image quality grades including bandwidths and encoding rates available for transmission and reception of the main video data and identification information to identify each of the plurality of image quality grades.

That is, the image quality information may be formed, for example, as in Table 1 below. Although Table 1 shows the image quality information including, for example, four image quality grades, the number of image quality grades included in the image quality information may change depending on a determination of the video server 200.

TABLE 1

BW1, 640 × 360, #1
BW2, 854 × 480, #2
BW3, 1280 × 720, #3
BW4, 2048 × 1536, #4
. . .

The terminal 100 stores the image quality information included in the variant playlist response message at operation 707.

Subsequently, the terminal 100 transmits, to the video server 200, a first playlist request message requesting chunk information for providing the main video data in the lowest level of image quality (for example, image quality grade #1 in Table 1) of the image quality information at operation 709. The terminal 100 receives a first playlist response message including chunk information #1 in response to the first playlist request message at operation 711. Here, chunk information #1 included in the playlist response message may be illustrated, for example, as in Table 2.

TABLE 2

1

Chunk1
Chunk2
Chunk3
. . .

The terminal 100 stores chunk information #1 included in the first playlist response message at operation 713.

The terminal 100 transmits, to the video server 200, a first chunk request message about a main video that includes a bandwidth between the terminal 100 and the video server 200, that is, the chunk information #1 to measure the highest video quality currently available for the terminal in downloading at operation 715. The terminal 100 receives chunk #1 from the video server 200 and examines whether an image quality for communication between the terminal 100 and the video server 200 is a threshold communication image quality at operation 717. Subsequently, the terminal 100 transmits, to the video server 200, playlist request messages about other image quality grades (that is, image quality grades #2 to #4) in the same manner as in operations 709 and 711, and receives playlist respond messages from the video server 200 at operations 719 to 729. Next, the terminal 100 may store pieces of chunk information #2 to #4 in an internal storage unit at operation 731.

Accordingly, the terminal 100 may store the pieces of chunk information #1 to #4 in the internal storage unit as in Table 3.

TABLE 3

BW1, 640 × 360, #1

Chunk1
Chunk2
Chunk3
. . .
BW2, 854 × 480, #2

Chunk1
Chunk2
Chunk3

TABLE 3-continued

| ... |
|---|
| BW3, 1280 × 720, #3 |
| Chunk1 |
| Chunk2 |
| Chunk3 |
| ... |
| BW4, 2048 × 1536, #4 |
| Chunk1 |
| Chunk2 |
| Chunk3 |
| ... |

Subsequently, the terminal 100 determines a bandwidth and an encoding rate for the main video data using the stored chunk information at operation 733. For example, the terminal 100 may select a bandwidth and an encoding rate corresponding to the maximum available bandwidth of the stored chunk information in order to output the high-quality main video data. Here, when chunk information #4 has the bandwidth and the encoding rate corresponding to the maximum available bandwidth, the terminal 100 transmits a chunk request message requesting chunk #4 to the video server 200 at operation 735. The terminal 100 receives a chunk response message including chunk #4 from the video server 200 at operation 737 and provides the main video data with an image quality corresponding to chunk #4. The terminal 100 continuously tracks the maximum available bandwidth that is available to provide the main video data at operation 739.

Subsequently, when the terminal 100 receives a user input requesting sub-video data while outputting the high-quality main video data on the screen, the terminal 100 needs to determine a bandwidth and an encoding rate for the requested sub-video data and to output the sub-video data on the screen according to the determined bandwidth and encoding rate for the sub-video data. In the embodiment of the present disclosure, there are two embodiments of a method for determining the bandwidth and encoding rate for the sub-video data. A first embodiment of the present disclosure relates to a method for determining a bandwidth and an encoding rate for sub-video data such that main video data and the sub-video data have differential image qualities based on content interest. A second embodiment of the present disclosure relates to a method for determining a bandwidth and an encoding rate for sub-video data to have image quality that has a negligible as possible effect on the image quality of main video data.

First, a method for the terminal 100 to output main video data and sub-video data in differential image qualities on a single screen according to the first embodiment of the present disclosure is described as follows. For example, the terminal 100 according to the first embodiment of the present disclosure does not output 360-degree main video data and 2D sub-video data in the same image quality on the single screen but outputs the main video data and the sub-video data in different image qualities according to user option information. Here, the user option information may be determined based on a spot (for example, a head clicking spot) that the user is looking at (user's viewpoint) by a plurality of sensors included in an input unit of the terminal 100. The sub-video data corresponding to the user option information may be determined by the terminal 100 as a video having a content interest characteristic. That is, in the first embodiment of the present disclosure, a video with a content interest characteristic refers to a video that the user pays attention to at a moment among a plurality of videos that the user is allowed to watch at the moment within a service. Hereinafter, for convenience of description, a VR tour service is illustrated as an example of a service according to the first embodiment of the present disclosure, but the first embodiment of the present disclosure may also be applicable to other VR services.

When the terminal 100 provides a VR tour service, the user may be provided with a video service from the terminal 100 according to the following scenario. First, the user requests additional information on main video data and concentrates on watching sub-video data while the sub-video data corresponding to the additional information is being output. When the sub-video data ends, the user concentrates back on watching the main video data. Further, while the sub-video data is being played on the terminal 100, the user may turn the user's head to concentrate on watching the main video data. Representing this user scenario with a content interest characteristic provided by the terminal 100, when the terminal 100 detects an event of being requested to provide sub-video data, the terminal 100 continues outputting the sub-video data and a sub-video is a content interest. When outputting the sub-video data is finished, a main video is once again a content interest on the terminal 100. When the terminal 100 recognizes a user's head movement while outputting the sub-video data, the terminal 100 determines either the main video or the sub-video as a content interest according to the user's head movement.

Here, the terminal 100 needs to determine bandwidths and encoding rates for the main video data and the sub-video data on the same screen within the maximum available bandwidth according to a content interest characteristic.

Figure 8:
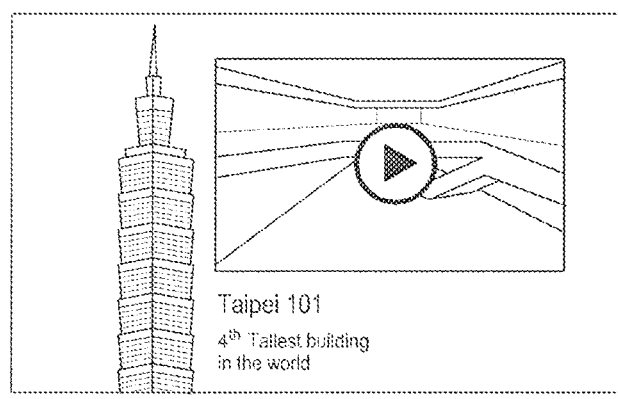
FIG. 8 illustrates a terminal outputting sub-video data on a screen that is displaying main video data according to an embodiment of the present disclosure.
Figure 9:
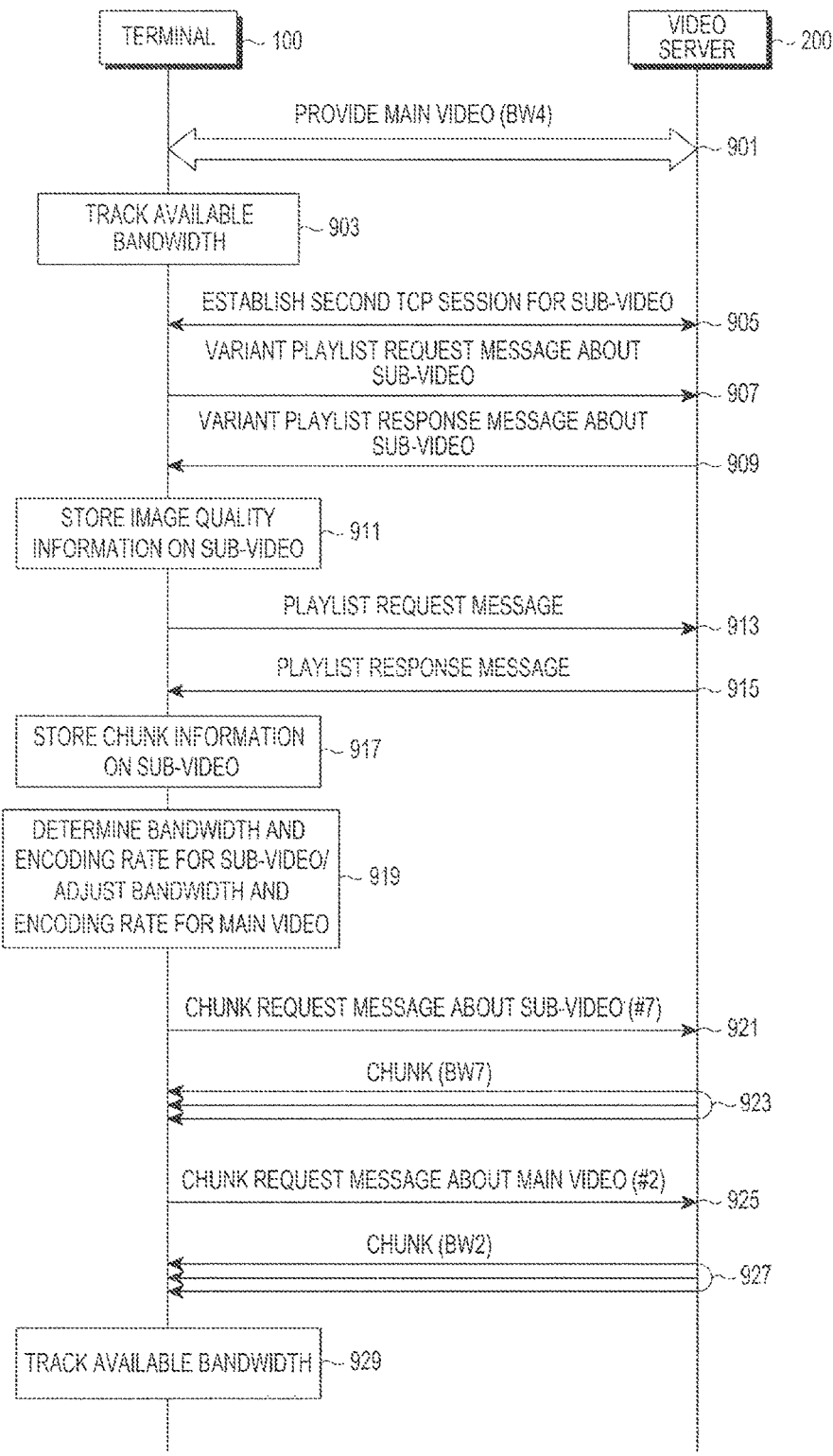
FIG. 9 illustrates a method of a terminal to output sub-video data on the screen that is displaying main video data according to an embodiment of the present disclosure.
Figures 10, 11:
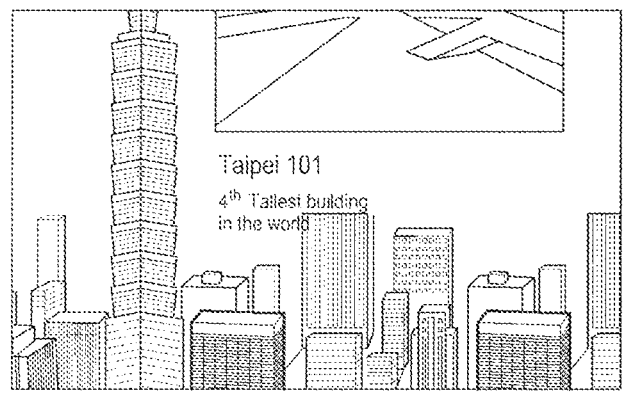
FIG. 10 illustrates a case where a content interest characteristic is changed from sub-video data to main video data according to an embodiment of the present disclosure.
FIG. 11 illustrates an example of a screen for inputting priorities of video qualities on a terminal according to an embodiment of the present disclosure.

To this end, FIGS. 8 and 9 illustrate a case where the terminal 100 outputs sub-video data according to user option information according to an embodiment of the present disclosure. Further, FIG. 10 illustrates an example of a case where user option information is changed while the terminal 100 is outputting sub-video data according to an embodiment of the present disclosure.

FIG. 8 illustrates an example that the terminal according to the first embodiment of the present disclosure outputs sub-video data on a screen that is displaying main video data.

Referring to FIG. 8, when the terminal 100 detects an event of being requested to provide sub-video data while outputting main video data, the terminal 100 may provide the sub-video data in high quality within the maximum available bandwidth and may change the quality of the main video data to low image quality. That is, the terminal 100 may configure the main video data and the sub-video data to have differential image qualities according to a content interest characteristic of the user. Accordingly, the first embodiment of the present disclosure may satisfy user QoE with the limited bandwidth of the terminal 100.

FIG. 9 illustrates a method for the terminal according to the first embodiment of the present disclosure to output sub-video data on the screen that is displaying main video data. In the following description of FIG. 9, it is assumed, as described in FIG. 7, that the terminal 100 outputs main video data with high quality corresponding to chunk #4 (that is, bandwidth 4).

Referring to FIG. 9, the terminal 100 outputs the main video data with high quality corresponding to chunk #4 at operation 901 and continuously tracks the maximum available bandwidth that is available to output the main video data at operation 903.

The terminal 100 establishes, with the video server 200, a TCP session for the sub-video data at operation 905. Here, the TCP session between the terminal 100 and the video server 200 is established while the terminal 100 is outputting the main video data with high quality and before it is requested to output the sub-video data, which will be described before in detail with reference to a TCP session establishment method according to an embodiment of the present disclosure.

Next, when the terminal 100 receives a user input requesting the sub-video data, the terminal 100 transmits, to the video server 200, a variant playlist request message for requesting image quality information on the sub-video data at operation 907. The terminal 100 receives, from the video server 200, a variant playlist response message including the image quality information on the sub-video data in response to the variant playlist request message at operation 909. Here, the variant playlist response message may include, as the image quality information on the sub-video data, a plurality of image quality grades including bandwidths and encoding rates available for transmission and reception of the sub-video data and identification information to identify each of the plurality of image quality grades. The terminal 100 may store the image quality information on the sub-video data included in the variant playlist response message in the internal storage unit at operation 911. The terminal 100 transmits a plurality of playlist request messages about the respective image quality grades included in the image quality information at operation 913 and receives a plurality of playlist response messages including chunk information on each of the image quality grades at operation 915. Operations 913 and 915 performed by the terminal 100 are similar to operations 709 to 729 of FIG. 7, and thus a detailed description thereof is omitted.

The terminal 100 stores the chunk information included in each of the playlist response messages in the internal storage unit at operation 917. For example, when there are three image quality grades (#5 to #7) for the sub-video data, the terminal 100 may store, as the chunk information on the sub-video data, chunk information #5 to #7 in Table 4.

TABLE 4

| BW5, 640 × 360, #5 |
|---|
| Chunk1 |
| Chunk2 |
| Chunk3 |
| ... |
| BW6, 854 × 480, #6 |
| Chunk1 |
| Chunk2 |
| Chunk3 |
| ... |
| BW7, 1280 × 720, #7 |
| Chunk1 |
| Chunk2 |
| Chunk3 |
| ... |

The terminal 100 determines a bandwidth and an encoding rate for the sub-video data within the maximum available bandwidth using the stored chunk information on the sub-video data and adjusts the bandwidth and encoding rate for the main video data at operation 919. For example, the terminal 100 may select, from the stored chunk information on the sub-video data, a bandwidth and an encoding rate for providing the sub-video data with the highest image quality in order to provide the high-quality sub-video data. Here, when chunk information #7 has the bandwidth and the encoding rate for outputting the sub-video data with the highest image quality, the terminal 100 selects a bandwidth and an encoding rate corresponding to chunk information #7. The terminal 100 adjusts the bandwidth for the main video data based on a difference between the maximum available bandwidth (that is, the band width corresponding to chunk information #4) and the bandwidth selected by the terminal 100 (that is, the bandwidth corresponding to chunk information #7). Further, the terminal 100 selects, from the stored chunk information on the main video data, a bandwidth and an encoding rate corresponding to a bandwidth (for example, #2) that is equal to or smaller than the adjusted bandwidth for the main video data.

The terminal 100 transmits a chunk request message requesting chunk #7 relating to the sub-video data to the video server 200 at operation 921. The terminal 100 receives a chunk response message including chunk #7 from the video server 200 at operation 923 and outputs the sub-video data with a high image quality corresponding to chunk #7. Further, the terminal 100 transmits a chunk request message requesting chunk #2 relating to the main video data to the video server 200 at operation 925. The terminal 100 receives a chunk response message including chunk #2 from the video server 200 at operation 927 and outputs the main video data with a low image quality corresponding to chunk #2. The terminal 100 continuously tracks the maximum available bandwidth that is available to provide the main video data and the sub-video data at operation 929.

In addition, when the content interest characteristic of the user is changed to the main video data while the sub-video data is being output, the terminal 100 may output the main video data in high quality and may reduce the image quality of the sub-video data according to a procedure similar to that of FIG. 9, as illustrated in FIG. 10.

FIG. 10 illustrates an example of a case where a content interest characteristic is changed from sub-video data to main video data according to the first embodiment of the present disclosure.

Referring to FIG. 10, for example, when the terminal 100 detects that the user puts the user's head down to a portion that is displaying the main video data while outputting high-quality sub-video data, as illustrated in FIG. 10, the terminal 100 may output the main video data in high image quality and output the sub-video data in reduced low image quality. Accordingly, the terminal 100 may satisfy user QoE with a limited bandwidth.

Meanwhile, the second embodiment of the present disclosure relates to a method for determining the image quality of sub-video data that has a negligible as possible effect on the image quality of main video data. To this end, in the second embodiment of the present disclosure, the terminal 100 sets a priority for the main video data, thereby maintaining the image quality of the main video data while the VR service is provided. For example, the terminal 100 according to the second embodiment of the present disclosure may set priorities for video qualities as in FIG. 11 when starting to implement the VR service.

FIG. 11 illustrates an example of a screen for inputting priorities of video qualities on the terminal in which a priority is set, for example, for video data displayed in full screen (that is, main video data) according to an embodiment of the present disclosure.

Referring to FIG. 11, the terminal 100 may store the priorities selected by the user in the internal storage unit. Further, the second embodiment of the present disclosure may also be applied similarly when a priority is set for video data (that is, sub-video data) selected by the user to be displayed in a portion of the screen on the terminal 100 and when a priority varies depending on a network condition.

Figure 12:
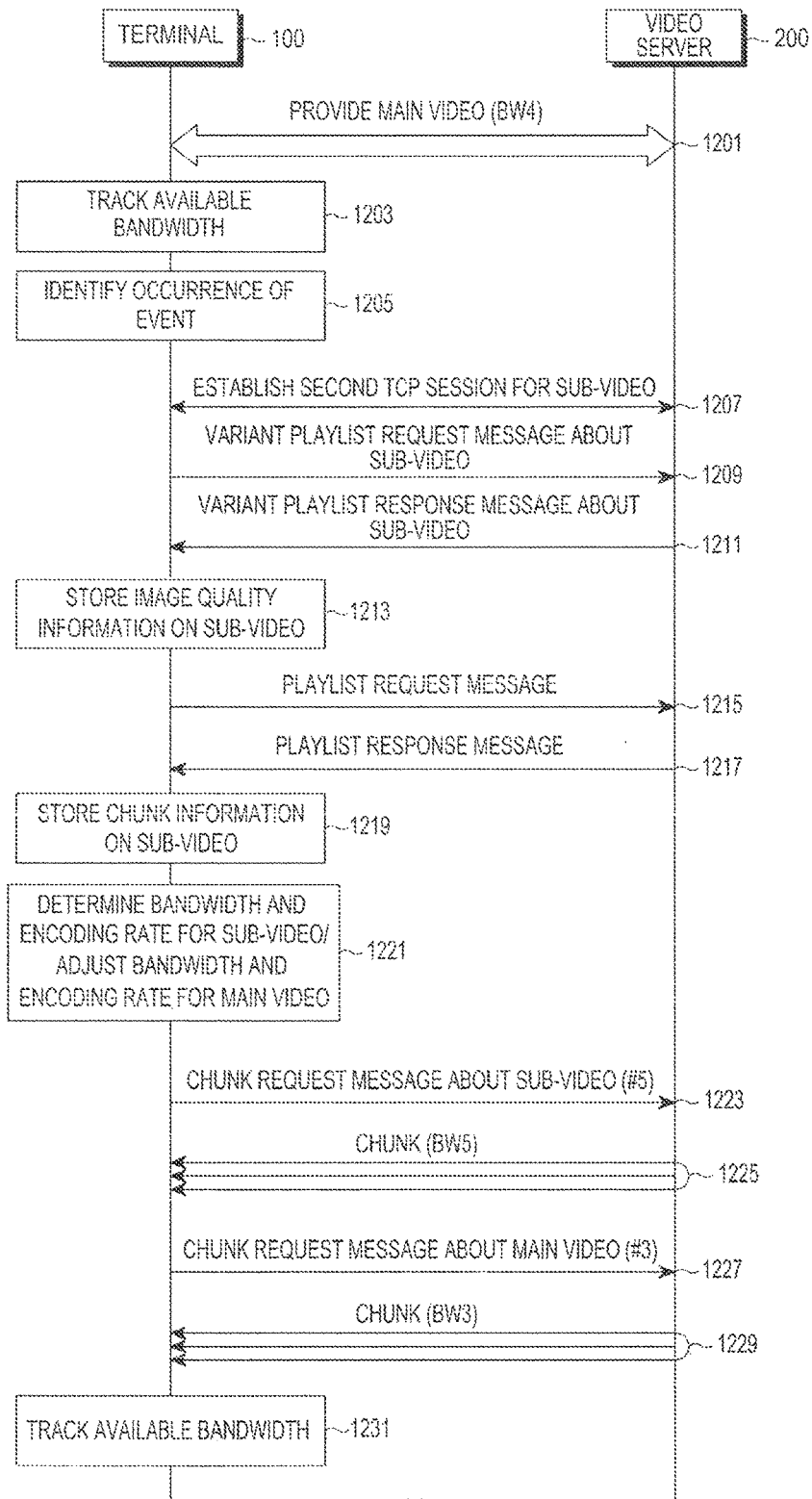
FIG. 12 illustrates a method of a terminal to output sub-video data on a screen that is displaying main video data according to an embodiment of the present disclosure.

FIG. 12 illustrates a method for the terminal to output sub-video data on the screen that is displaying main video data according to an embodiment of the present disclosure. In the following description of FIG. 12, it is assumed, as described in FIG. 7, that the terminal 100 outputs main video data with high quality corresponding to chunk #4 (that is, bandwidth 4).

Referring to FIG. 12, the terminal 100 outputs the main video data with high quality corresponding to chunk #4 at operation 1201 and continuously tracks the maximum available bandwidth that is available to provide the main video data at operation 1203.

Next, the terminal 100 identifies whether an event of being requested to provide the sub-video data occurs at operation 1205. Here, the terminal 100 may identify, through a push message from a specific video server 200, whether the event occurs or may identify whether the event (for example, a user option) occurs in the terminal 100 itself.

The terminal 100 establishes, with the video server 200, a second TCP session for transmission and reception of the sub-video data at operation 1207. Here, the second TCP session between the terminal 100 and the video server 200 is established while the terminal 100 is providing the main video data with high quality and before it is requested to output the sub-video data, which will be described below in detail with reference to a TCP session establishment method according to an embodiment of the present disclosure.

When the terminal 100 is requested to output the sub-video data through the event, the terminal 100 transmits, to the video server 200, a variant playlist request message for requesting image quality information on the sub-video data at operation 1209. The terminal 100 receives, from the video server 200, a variant playlist response message including the image quality information on the sub-video data in response to the variant playlist request message at operation 1211. Here, the variant playlist response message may include, as the image quality information on the sub-video data, a plurality of image quality grades including bandwidths and encoding rates available for transmission and reception of the sub-video data and identification information to identify each of the plurality of image quality grades. The terminal 100 may store the image quality information on the sub-video data included in the variant playlist response message in the internal storage unit at operation 1213. The terminal 100 transmits a plurality of playlist request messages about the respective image quality grades included in the image quality information at operation 1215 and receives a plurality of playlist response messages including chunk information on each of the image quality grades at operation 1217. Operations 1215 and 1217 performed by the terminal 100 are similar to operations 709 to 729 of FIG. 7, and thus a detailed description thereof is omitted.

The terminal 100 stores the chunk information included in each of the playlist response messages in the internal storage unit at operation 1219. For example, the terminal 100 may store, as the chunk information on the sub-video data, chunk information #5 to #7 in Table 4 in the internal storage unit.

The terminal 100 determines a bandwidth and an encoding rate for the sub-video data within the maximum available bandwidth using the stored chunk information on the sub-video data and adjusts the bandwidth and encoding rate for the main video data at operation 1221. Here, the terminal 100 may select, from the stored chunk information on the sub-video data, a bandwidth and an encoding rate for transmitting and receiving the sub-video data with the lowest image quality so as not to affect the image quality of the main video data. For example, when chunk information #5 has the bandwidth and the encoding rate for transmitting and receiving the sub-video data with the lowest image quality, the terminal 100 selects, from the stored chunk information, a bandwidth and an encoding rate corresponding to chunk information #5. The terminal 100 adjusts the bandwidth for the main video data based on a difference between the maximum available bandwidth (that is, the band width corresponding to chunk information #4) and the bandwidth selected by the terminal 100 (that is, the bandwidth corresponding to chunk information #5). Further, the terminal 100 selects, from the stored chunk information on the main video data, a bandwidth and an encoding rate corresponding to a bandwidth (for example, #3) that is equal to the adjusted bandwidth for the main video data.

The terminal 100 transmits a chunk request message requesting chunk #5 relating to the sub-video data to the video server 200 at operation 1223. The terminal 100 receives a chunk response message including chunk #5 from the video server 200 at operation 1225 and outputs the sub-video data with an image quality corresponding to chunk #5 on the screen. Further, the terminal 100 transmits a chunk request message requesting chunk #3 relating to the main video data to the video server 200 at operation 1227. The terminal 100 receives a chunk response message including chunk #3 from the video server 200 at operation 1229 and outputs the main video data with an image quality corresponding to chunk #3 on the screen. The terminal 100 continuously tracks the maximum available bandwidth that is available to transmit and receive the main video data and the sub-video data at operation 1231.

Figure 13:
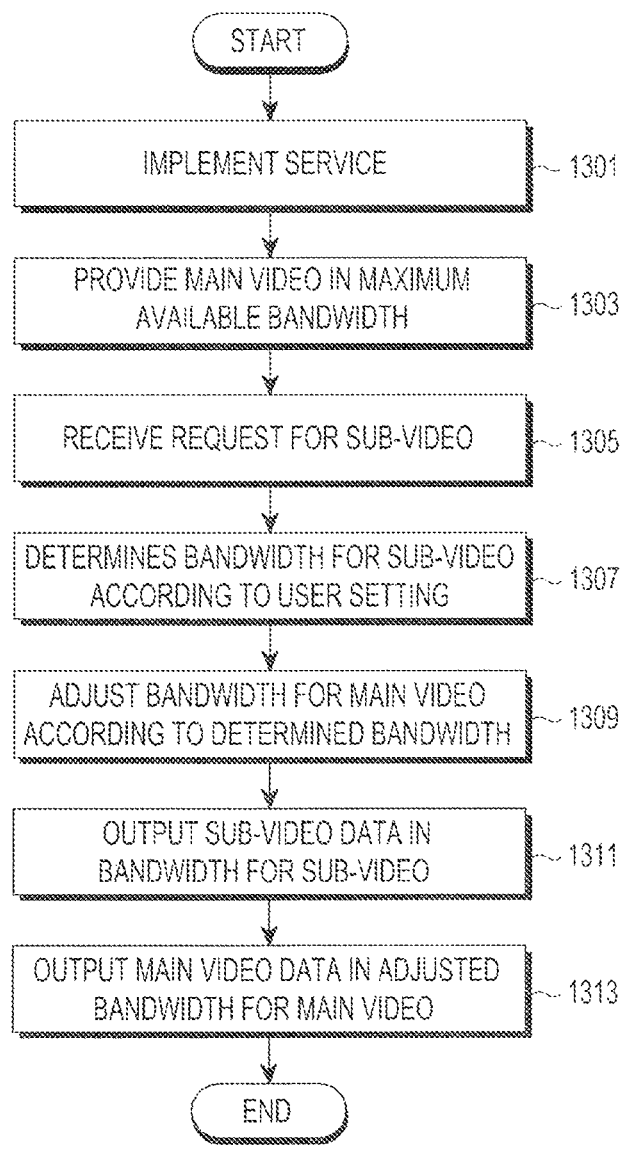
FIG. 13 illustrates a method of a terminal to output a plurality of video data through a single screen according to an embodiment of the present disclosure.

FIG. 13 illustrates a method for a terminal to output a plurality of video data through a single screen according to an embodiment of the present disclosure.

Referring to FIG. 13, when a VR service is detected, the terminal 100 runs the detected VR service at operation 1301. The terminal 100 provides main video data in the maximum available bandwidth at operation 1303. Accordingly, the terminal 100 may provide the main video data in high quality.

The terminal 100 receives a message of being requested to provide sub-video data from the user or the video server 200 at operation 1305. The terminal 100 determines a bandwidth for the sub-video data according to a user setting at operation 1307. For example, when the user setting is a content interest characteristic, the terminal 100 may determine a bandwidth and an encoding rate for the sub-video data according to a content interest characteristic of the user. For another example, when the user setting is a priority relating to video quality and the priority is set for the sub-video data, the terminal 100 may select a bandwidth and an encoding rate for outputting the sub-video data in high quality from image quality information on the sub-video data. For still another example, when the user setting is a priority relating to video quality and the priority is set for the main video data, the terminal 100 may select a bandwidth and an encoding rate for outputting the sub-video data in low quality from the image quality information on the sub-video data. For yet another example, when the user setting is a priority relating to video quality and the priority is set to vary on a network condition, the terminal 100 may select a bandwidth and an encoding rate for the sub-video data depending on a current network condition.

Next, the terminal 100 adjusts the bandwidth for the main video data according to the determined bandwidth for the sub-video data so as to simultaneously provide the sub-video data and the main video data within the maximum available bandwidth at operation 1309. That is, the terminal 100 adjusts the bandwidth for the main video data based on a difference between the maximum available bandwidth and the determined bandwidth for the sub-video data.

The terminal 100 outputs the sub-video data in the bandwidth for the sub-video data at operation 1311 and outputs the main video data in the adjusted bandwidth for the main video data at operation 1313.

Accordingly, a user of the terminal 100, according to an embodiment of the present disclosure, may be provided with a video service capable of simultaneously outputting main video data and sub-video data in user-desired image qualities on a single screen.

As illustrated in FIGS. 9 and 11, the terminal 100 needs to establish a new second TCP session for sub-video data in order to provide the sub-video data while providing main video data. Here, to minimize an initial delay by TCP session establishment time and a slow start that occur in the terminal 100, an embodiment of the present disclosure suggests a method for the terminal 100 to generate and manage the second TCP session for providing the sub-video data.

In detail, the TCP is a connection-oriented protocol, in which a session is established between the terminal 100 and the video server 200 after three-way handshake signaling. In the case of the video service capable of outputting sub-video data according to the embodiment of the present disclosure, there is quite a high possibility that a plurality of second TCP sessions are established. In this case, if the terminal 100 establishes a second TCP session not at the time that the sub-video data is requested but while outputting the main video data, a delay due to TCP session establishment time may be minimized. Accordingly, an embodiment of the present disclosure suggests a method for the terminal 100 to generate a second TCP session with the video server 200 while outputting main video and before being requested to output sub-video data.

Further, when the terminal 100 is requested to output sub-video data to a network including the video server 200, if the network recognizes the maximum available bandwidth that is available to the terminal 100, the network may set an initial window to be a bandwidth requested for the sub-video data to reduce an initial delay caused by a slow start. However, the initial window of the video server 200 has a random value that is set by the video server 200 and may not be changed by the terminal 100. Accordingly, an embodiment of the present disclosure suggests a method for a proxy server in the network to set the initial window value to control transmission rate.

Figure 14:
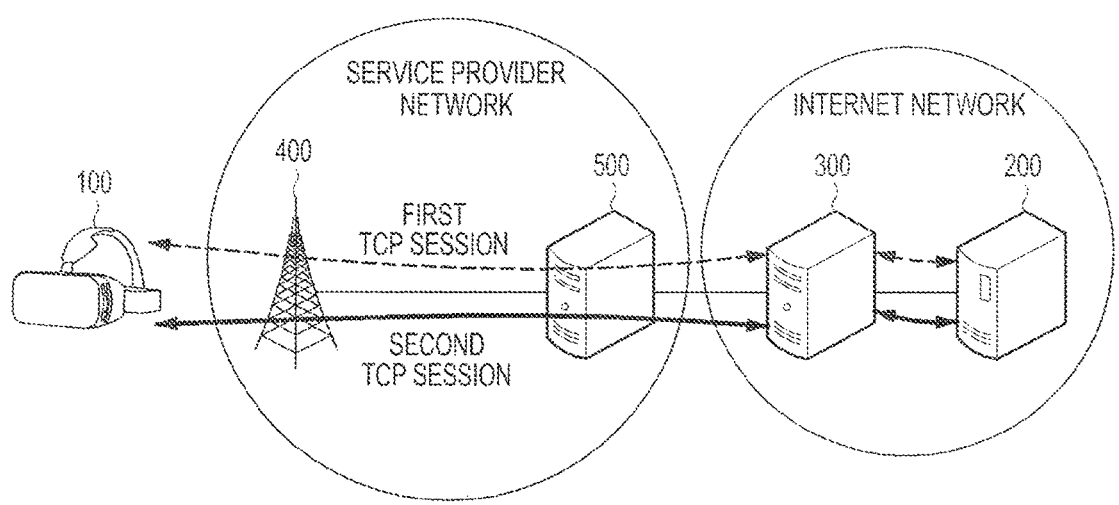
FIG. 14 illustrates an example of a communication system that provides a video according to an embodiment of the present disclosure.

First, FIG. 14 illustrates an example of a communication system that provides a video according to an embodiment of the present disclosure.

Referring to FIG. 14, the communication system according to the embodiment of the present disclosure includes a terminal 100, a video server 200 that provides a video, a proxy server 300, a base station 400, and a gateway 500. Here, the video server 200 and the proxy server 300 are included in an Internet network, and the base station 400 and the gateway 500 are included in a service provider network. The gateway 500 performs an operation of connecting the service provider network and the Internet network, and base station 400 transmits a signal and a message, received from the terminal 100, to the gateway 500 and transmits a signal and a message, received from the gateway 500, to the terminal 100.

Particularly, when implementing a video service capable of outputting a plurality of video data, the terminal 100 according to the embodiment of the present disclosure establishes, with the proxy server 300, a TCP session for sub-video data while outputting main video data and before being requested to output the sub-video data.

The proxy server 300 connects the service provider network and the video server 200, and particularly splits the TCP session between the terminal 100 and the video server 200 to adjust an initial window value. Accordingly, the proxy server 300 may control the transmission rates of the main video data and the sub-video data that are provided to the terminal 100.

Figure 15:
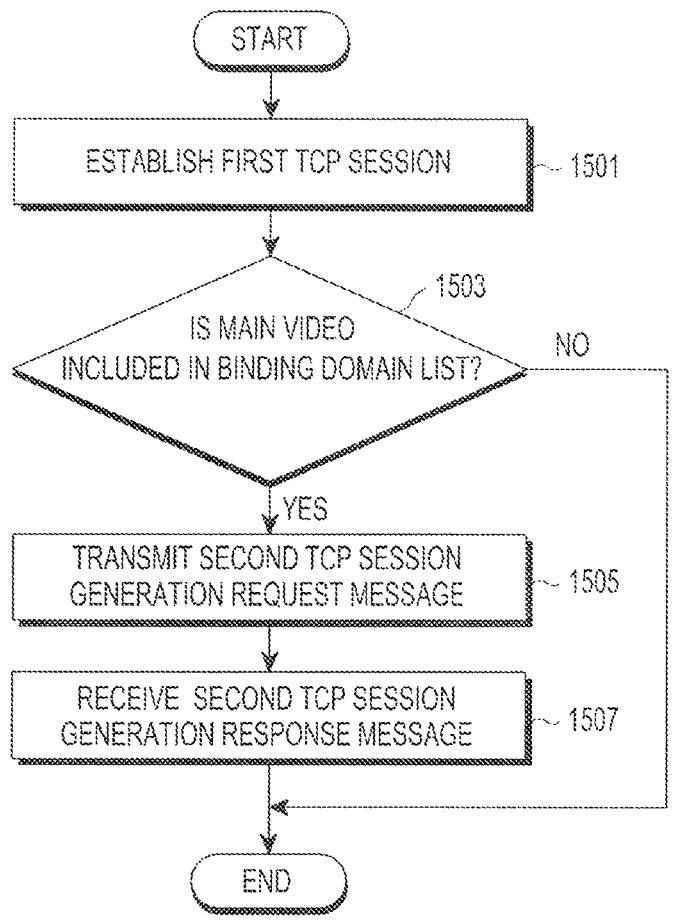
FIG. 15 illustrates a method of a terminal of a communication system to establish a transmission control protocol (TCP) session according to an embodiment of the present disclosure.
Figure 17:
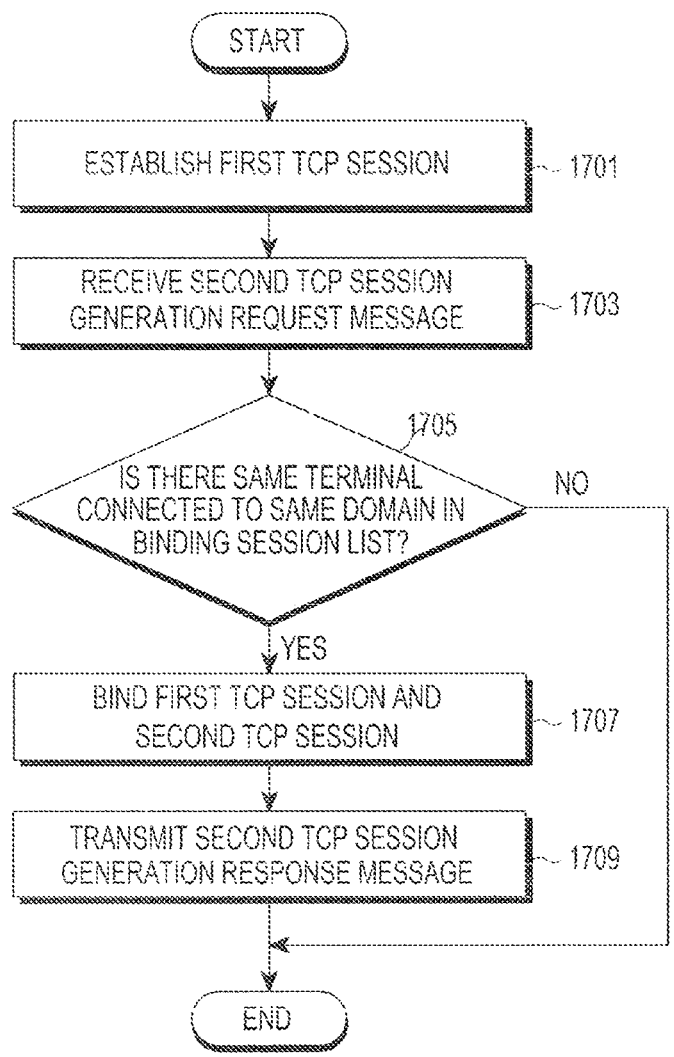
FIG. 17 illustrates a method for a proxy server of a communication system to establish a TCP session according to an embodiment of the present disclosure.

Specifically, the terminal 100 and the proxy server 300, according to the embodiment of the present disclosure, may operate as in FIGS. 15 and 17. In the following description, it is assumed that a first TCP session for main video data is already established between the terminal 100 and the server 200, and a process of establishing the first TCP session may be performed according to a general TCP session establishment process.

FIG. 15 illustrates a method for a terminal 100 of a communication system to establish a TCP session according to an embodiment of the present disclosure.

Referring to 15, the terminal 100 establishes, with a server 200, a first TCP session for main video data through a proxy server 300 at operation 1501. Next, the terminal 100 determines whether the main video data is included in a binding domain list at operation 1503. Here, the binding domain list is a list for identifying a service providing a plurality of video data, which includes a domain address of each of video data provided from a service providing a plurality of video data. The binding domain list is information shared in advance between the terminal 100 and the proxy server 300 and may be updated by each of the terminal 100 and the proxy server 300. For example, the terminal 100 may store a binding domain list illustrated in FIG. 16.

Figure 16:
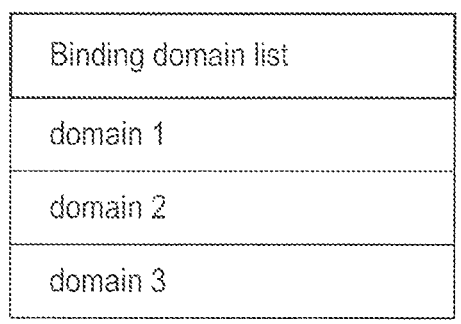
FIG. 16 illustrates an example of a binding domain list managed by a terminal according to an embodiment of the present disclosure.

FIG. 16 illustrates an example of a binding domain list managed by a terminal according to an embodiment of the present disclosure.

If the domain address that provides the main video data is included in the binding domain list, the terminal 100 transmits a second TCP session generation request message to the proxy server 300 in order to request establishment of a TCP session for sub-video data at operation 1505. Here, the second TCP session generation request message includes a marking indicating a request for generation of the second TCP session. For example, the marking may be included in an option field of a TCP SYN packet corresponding to the second TCP session generation request message.

The terminal 100 receives a second TCP session generation response message including a normal response to generation of the second TCP session in response to the second TCP session generation request message and establishes the second TCP session generated between the terminal 100 and the server 200 at operation 1507. If the second TCP session generation response message includes an abnormal response to generation of the second TCP session, the terminal 100 goes back to operation 1505 to request generation of the second TCP session again.

FIG. 17 illustrates a method for a proxy server of a communication system to establish a TCP session according to an embodiment of the present disclosure.

Referring to FIG. 17, the proxy server 300 establishes, with a terminal 100, a first TCP session for main video data at operation 1701. Next, the proxy server 300 receives, from the terminal 100, a second TCP session generation request message including a marking for requesting generation of a second TCP session at operation 1703. The proxy server 300 determines, based on a previously stored binding domain list, whether there is the first TCP session already established for the same domain with a terminal 100 that is the same as the terminal 100 that has transmitted the second TCP session generation request message at operation 1705. Here, the proxy server 300 may determine the sameness of the terminal 100 using the internet protocol (IP) address of the terminal 100 and may determine, using a domain address, whether there is the first TCP session for the same domain. When there is the first TCP session already established for the same domain with the same terminal 100, the proxy server 300 binds the first TCP session and a second TCP session at operation 1707. When binding of the first TCP session and the second TCP session is finished, the proxy server 300 transmits a second TCP session generation response message including a normal response to the second TCP session at operation 1709.

Here, binding of the first TCP session and the second TCP session is to manage information of a TCP session for the first TCP session and the second TCP session to provide the same service and transmission rate information on the first TCP session and the second TCP session. That is, the proxy server 300 stores and manages a binding domain list illustrated in FIG. 18.

FIGS. 18 and 19 illustrate examples of binding domain lists managed by a proxy server according to an embodiment of the present disclosure.

Here, the binding domain list illustrated in FIG. 18 is a list in a case where the second TCP session is generated but is not yet used, which is stored and managed by the proxy server 300 before the terminal 100 requests sub-video data. Further, the binding domain list stores the maximum available bandwidth and an encoding rate that are used to transmit and receive the main video data in first TCP session information.

Next, when the proxy server 300 receives a variant playlist request message about the sub-video data from the terminal 100, the proxy server 300 determines an initial window value for the second TCP session for transmitting and receiving the sub-video data based on the maximum available bandwidth and the encoding rate that are used to transmit and receive main video data in the binding domain list. The proxy server 300 adjusts the transmission rate of the main video data (that is, the first TCP session) in order to secure transmission of the sub-video data based on the determined initial window value. For example, the proxy server 300 determines the initial window value of the second TCP session as a bandwidth for the requested sub-video data based on the available bandwidth for the main video data, and reduces the transmission rate of the first TPC session by the bandwidth for the sub-video data if a main video data chunk is transmitted in the first TCP session. Accordingly, the proxy server 300 may manage and store a binding domain list illustrated in FIG. 19. That is, the binding domain list illustrated in FIG. 19 includes an example of binding session information stored in the proxy server 300 when the terminal 100 transmits a chunk request message to the proxy server 300 at bandwidth/encoding rate 2 relating to sub-video data.

Figure 20:
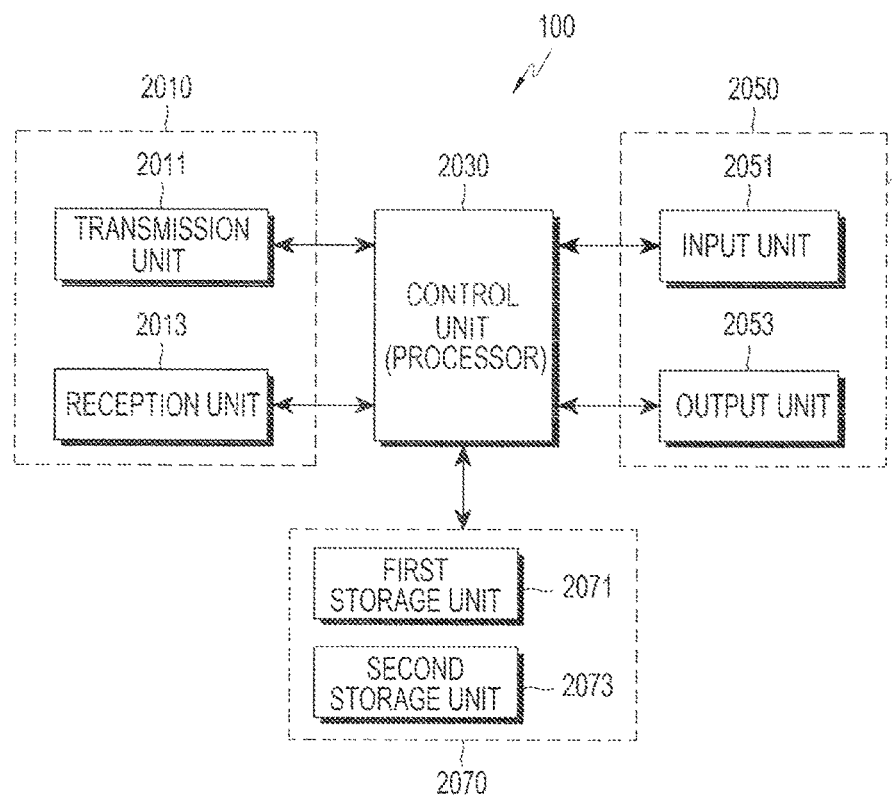
FIG. 20 illustrates a detailed configuration of a terminal that outputs a plurality of video data through a single screen according to an embodiment of the present disclosure.

FIG. 20 illustrates a detailed configuration of a terminal that outputs a plurality of video data through a single screen according to an embodiment of the present disclosure.

Referring to FIG. 20, the terminal 100 includes a transmission unit 2011, a reception unit 2013, a control unit 2030, an input unit 2051, an output unit 2053, and a storage unit 2070 to output a plurality of video data through a single screen to thereby provide a video service. Here, the transmission unit 2011 and the reception unit 2013 may be configured as a single transceiver unit 2010, and the input unit 2051 and the output unit 2053 may also be configured as a single input/output unit 2050.

First, the input unit 2051 includes a plurality of sensors to detect a user option in the embodiment of the present disclosure. For example, the input unit 2051 may include a plurality of gyro sensors to detect user head tracking.

The control unit 2030 controls overall operations of the terminal 100, and particularly controls operations relating to an operation of the terminal 100, according to the embodiment of the present disclosure, simultaneously outputting main video data and sub-video data. The operations relating to the operation of the terminal 100, according to the embodiment of the present disclosure, simultaneously outputting main video data and sub-video data are the same as those illustrated in FIGS. 6 to 13, and thus a detailed description thereof is omitted herein.

The transmission unit 2011 transmits various kinds of signals and various kinds of messages to the video server 200 according to control by the control unit 2030. Here, the various kinds of signals and the various kinds of messages transmitted by the transmission unit 2011 are the same as those described in FIGS. 6 to 13, and thus a description thereof is omitted herein.

The reception unit 2013 receives various kinds of signals and various kinds of messages from the video server 200 according to control by the control unit 2030. Here, the various kinds of signals and the various kinds of messages received by the reception unit 2013 are the same as those described in FIGS. 6 to 13, and thus a description thereof is omitted herein.

The storage unit 2070 may comprise a first storage unit 2071 that stores a program and various kinds of information relating to an operation of the terminal 100, according to an embodiment of the present disclosure, providing a video service according to control by the control unit 2030. Further, the storage unit 2070 may comprise a second storage unit 2073 that stores the various kinds of signals and the various kinds of messages received by the reception unit 2013 from the video server 200.

The output unit 2053 outputs various kinds of signals and various kinds of messages relating to an operation of the terminal 100, according to the embodiment of the present disclosure, providing a video service according to control by the control unit 2030. Here, the various kinds of signals and the various kinds of messages output by the output unit 2053 are the same as those described in FIGS. 6 to 13, and thus a description thereof is omitted herein.

Although FIG. 20 shows that the terminal 100 is configured to include the transceiver unit 2010, the control unit 2030, the input/output unit 2050, and the storage unit 2070 as separate units, the terminal 100 may also be configured such that at least two of the transceiver unit 2010, the control unit 2030, input/output unit 2050, and the storage unit 2070 are integrated. Further, the terminal 100 may also be configured as a single processor.

Figure 21:
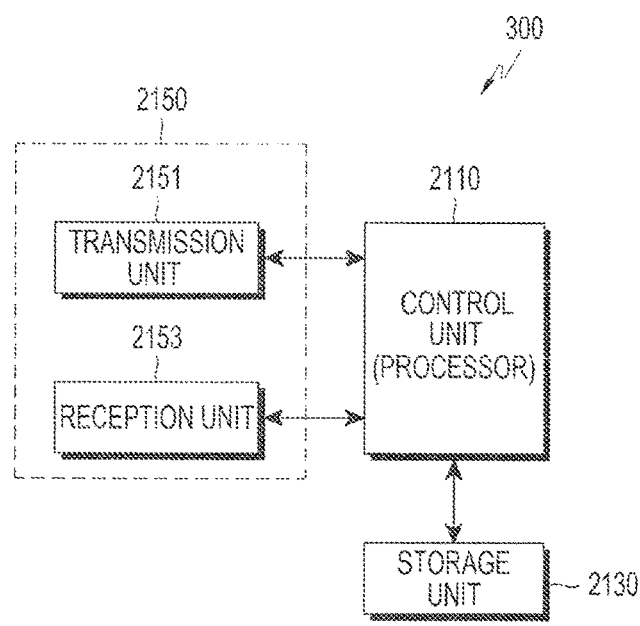
FIG. 21 illustrates a detailed configuration of a proxy server of a communication system that establishes a TCP session according to an embodiment of the present disclosure.

FIG. 21 illustrates a detailed configuration of a proxy server of a communication system that establishes a TCP session according to an embodiment of the present disclosure.

Referring to FIG. 21, the proxy server 300 includes a control unit 2110, a storage unit 2130, a transmission unit 2151, and a reception unit 2153 in order to establish, with a terminal 100, a TCP session for a service providing a plurality of video data. Here, the transmission unit 2151 and the reception unit 2153 may be configured as a single transceiver unit 2150.

The control unit 2110 controls overall operations of the proxy server 300, and particularly controls operations relating to an operation of the proxy server 300, according to the embodiment of the present disclosure, establishing a TCP session with the terminal 100 for a service providing a plurality of video data. The operations relating to the operation of the proxy server 300, according to the embodiment of the present disclosure, establishing a TCP session are the same as those illustrated in FIGS. 14 to 19, and thus a detailed description thereof is omitted herein.

The transmission unit 2151 transmits various kinds of signals and various kinds of messages to the terminal 100 or the video server 200 according to control by the control unit 2110. Here, the various kinds of signals and the various kinds of messages transmitted by the transmission unit 2151 are the same as those described in FIGS. 14 to 19, and thus a description thereof is omitted herein.

Further, the reception unit 2153 receives various kinds of signals and various kinds of messages from the terminal 100 or the video server 200 according to control by the control unit 2110. Here, the various kinds of signals and the various kinds of messages received by the reception unit 2153 are the same as those described in FIGS. 14 to 19, and thus a description thereof is omitted herein.

The storage unit 2130 stores a program and various kinds of information relating to the operation of the proxy server 300, according to the embodiment of the present disclosure, establishing the TCP session with the terminal 100 according to control by the control unit 2110. Further, the storage unit 2130 stores the various kinds of signals and the various kinds of messages received by the reception unit 2153 from the terminal 100 and the video server 200.

Although FIG. 21 shows that the proxy server is configured to include the transceiver unit 2150, the control unit 2110, and the storage unit 2130 as separate units, the proxy server may also be configured such that at least two of the transceiver unit 2150, the control unit 2110, and the storage unit 2130 are integrated. Further, the proxy server may also be configured as a single processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a video service by a terminal which includes a transceiver, a sensor, a display, and a processor, the method comprising:
   requesting, at the transceiver to a server, to transmit first video data in a maximum available bandwidth;
   receiving, at the transceiver from the server, the first video data in the maximum available bandwidth;
   transmitting, at the transceiver to the server, a request message that requests establishment of a second transmission control protocol (TCP) session if a domain address providing the first video data is included in a domain address list comprising domain addresses providing the video service;
   detecting, at the sensor, an event for requesting second video data while outputting, at the display, the first video data;
   determining, by the processor, a first bandwidth for the first video data and a second bandwidth for the second video data within the maximum available bandwidth so that the first video data and the second video data have differential image qualities;
   requesting, at the transceiver to the server, to transmit the first video data in the first bandwidth and to transmit the second video data in the second bandwidth;
   receiving, at the transceiver from the server, the first video data in the first bandwidth and the second video data in the second bandwidth;
   outputting, by the display, the first video data on an entire screen of the display and the second video data on a part of the entire screen of the display;
   determining, by the sensor, a point of the display based on a viewpoint of a user or a head movement of the user;
   selecting, by the processor, either the first video data or the second video data, which correspond to the point; and
   adjusting, by the processor, the first bandwidth and the second bandwidth within the maximum available bandwidth so that the selected video data is outputted in high quality.

2. The method of claim 1, wherein the first video data is received at the transceiver from the server through a first transmission control protocol (TCP) session.

3. The method of claim 1, wherein, when the server is a video server, the method further comprises establishing, with the video server, a second transmission control protocol (TCP) session for receiving the second video data before the event for requesting the second video data is detected at the sensor.

4. The method of claim 1, before detecting the event further comprising:
   receiving, at the transceiver from the server, a response message that indicates that the second TCP session is established,
   wherein the server is a proxy server and is connected to a video server.

5. The method of claim 1, wherein the determining of the first bandwidth and the second bandwidth comprises:
   receiving, at the transceiver from the server, bandwidth information on at least one bandwidth available for transmission and reception of the second video data;
   determining, by the processor, the second bandwidth of the at least one bandwidth based on preset information; and
   determining, by the processor, the first bandwidth based on the second bandwidth within the maximum available bandwidth,
   wherein the at least one bandwidth is determined according to an initial window value for a second transmission control protocol (TCP) session determined based on the maximum available bandwidth, and
   wherein the preset information is one of information indicating that image quality of the first video data has a higher priority than image quality of the second video data, information indicating that the image quality of the second video data has a higher priority than the image quality of the first video data, and network condition information.

6. A method for providing a video service by a video server which includes a transceiver and a processor, the method comprising:
    receiving, at the transceiver from a terminal, a request message requesting reception of first video data in a maximum available bandwidth;
    transmitting, at the transceiver to the terminal, the first video data in the maximum available bandwidth;
    receiving, at the transceiver from the terminal, a request message that requests establishment of a second transmission control protocol (TCP) session if a domain address providing the first video data is included in a domain address list comprising domain addresses providing the video service;
    receiving, at the transceiver from the terminal, a request message requesting reception of the first video data in a first bandwidth within the maximum available bandwidth and a request message requesting reception of second video data in a second bandwidth; and
    transmitting, at the transceiver to the terminal, the first video data in the first bandwidth and the second video data in the second bandwidth,
    wherein the first bandwidth and the second bandwidth are determined to provide differential image qualities,
    wherein the first video data is outputted on an entire screen of the terminal and the second video data is outputted on a part of the entire screen of the terminal,
    wherein a point of the display is determined at the terminal based on a viewpoint of a user or a head movement of the user,
    wherein either the first video data or the second video data, which corresponds to the point, is selected at the terminal, and
    wherein, at the terminal, the first bandwidth and the second bandwidth are adjusted within the maximum available bandwidth so that the selected video data is outputted in high quality.

7. The method of claim 6, further comprising:
    establishing, between the video server and the terminal, a second transmission control protocol (TCP) session for transmitting and receiving the second video data before the request message requesting reception of the second video data in the second bandwidth is received,
    wherein the first video data is transmitted to the terminal through a first TCP session.

8. An apparatus of a terminal for providing a video service, the apparatus comprising:
    a processor;
    a transceiver;
    a sensor; and
    a display,
    wherein the transceiver is configured to:
        request a server to transmit first video data in a maximum available bandwidth,
        receive, from the server, the first video data in the maximum available bandwidth, and
        transmit, to the server, a request message that requests establishment of a second transmission control protocol (TCP) session if a domain address providing the first video data is included in a domain address list comprising domain addresses providing the video service,
    wherein the sensor is configured to detect an event for requesting second video data while outputting, at the display, the first video data,
    wherein the processor is configured to determine a first bandwidth for the first video data and a second bandwidth for the second video data within the maximum available bandwidth so that the first video data and the second video data have differential image qualities,
    wherein the transceiver is configured to:
        request the server to transmit the first video data in the first bandwidth and transmit the second video data in the second bandwidth, and
        receive the first video data in the first bandwidth and the second video data in the second bandwidth from the server, and
    wherein the display is configured to output the first video data on an entire screen of the display and the second video data on a part of the entire screen of the display,
    wherein the sensor is configured to determine a point of the display based on a viewpoint of a user or a head movement of the user,
    wherein the processor is configured to select either the first video data or the second video data, which corresponds to the point, and
    wherein the processor is configured to adjust the first bandwidth and the second bandwidth within the maximum available bandwidth so that the selected video data is outputted in high quality.

9. The apparatus of claim 8, wherein the first video data is received at the transceiver from the server through a first transmission control protocol (TCP) session.

10. The apparatus of claim 8, wherein, when the server is a video server, the processor is further configured to establish, with the video server, a second transmission control protocol (TCP) session for receiving the second video data before the event for requesting the second video data is detected at the sensor.

11. The apparatus of claim 8, before detecting the event wherein the transceiver is further configured to
    identify a response message that indicates that the second TCP session is established, which is transmitted from the server, and
wherein the server is a proxy server and is connected to a video server.

12. The apparatus of claim 8,
    wherein the processor is further configured to:
        determine based on preset information, the second bandwidth of at least one bandwidth available for transmission and reception of the second video data received from the server, and
        determine the first bandwidth based on the second bandwidth within the maximum available bandwidth,
    wherein the at least one bandwidth is determined according to an initial window value for a second transmission control protocol (TCP) session determined based on the maximum available bandwidth, and
    wherein the preset information is one of information indicating that image quality of the first video data has a higher priority than image quality of the second video data, information indicating that the image quality of the second video data has a higher priority than the image quality of the first video data, and network condition information.

13. An apparatus of a video server for providing a video service, the apparatus comprising:
    a processor; and
    a transceiver,
    wherein the transceiver is configured to:
        receive, from a terminal, a request message requesting reception of first video data in a maximum available bandwidth, a request message requesting reception of the first video data in a first bandwidth within the maximum available bandwidth, and a request message requesting reception of second video data in a second bandwidth, transmit, to the terminal, the first video data in the maximum available bandwidth, receive, from the terminal, a request message that requests establishment of a second transmission control protocol (TCP) session if a domain address providing the first video data is included in a domain address list comprising domain addresses providing the video service, transmit the first video data in the first bandwidth, and transmit the second video data in the second bandwidth, wherein the first bandwidth and the second bandwidth are determined to provide differential image qualities, wherein the first video data is outputted on an entire screen of the terminal and the second video data is outputted on a part of the entire screen of the terminal, wherein a point of the display is determined at the terminal based on a viewpoint of a user or head movement of the user, wherein either the first video data or the second video data, which corresponds to the point, is selected at the terminal, and wherein, at the terminal, the first bandwidth and the second bandwidth are adjusted within the maximum available bandwidth so that the selected video data is outputted in high quality.

14. The apparatus of claim 13, wherein the processor is further configured to establish, with the terminal, a second transmission control protocol (TCP) session for transmitting and receiving the second video data before the request message requesting reception of the second video data in the second bandwidth is received, wherein the first video data is transmitted to the terminal through a first TCP session, wherein the video server is included on an Internet, and wherein the processor is further configured to establish the first TCP session and the second TCP session with the terminal via a gateway of a service provider network.

\* \* \* \* \*